US008988187B2

(12) United States Patent
Wong et al.

(10) Patent No.: US 8,988,187 B2
(45) Date of Patent: Mar. 24, 2015

(54) PROXIMITY BASED BIOMETRIC IDENTIFICATION SYSTEMS AND METHODS

(75) Inventors: Shek Duncan Wong, Hong Kong (HK); Jack Sik Ching Poon, Kennedy Town (HK); Tak Shing Peter Yum, Hong Kong (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 541 days.

(21) Appl. No.: 13/006,145

(22) Filed: Jan. 13, 2011

(65) Prior Publication Data

US 2012/0249292 A1     Oct. 4, 2012

(51) Int. Cl.
*G05B 19/00* (2006.01)
*G06K 5/00* (2006.01)
*H04L 9/32* (2006.01)
(Continued)

(52) U.S. Cl.
CPC .......... *H04L 9/3231* (2013.01); *G07C 9/00087* (2013.01); *G06Q 20/40145* (2013.01); *G06F 21/32* (2013.01); *H04L 9/0866* (2013.01); *H04L 9/3273* (2013.01); *H04L 63/0853* (2013.01); *H04L 63/0869* (2013.01); *H04L 63/102* (2013.01); *H04L 2209/88* (2013.01)
USPC .......... 340/5.52; 340/5.82; 340/5.8; 235/380; 713/169; 713/186

(58) Field of Classification Search
CPC . G06F 21/32; G06F 21/6245; H04L 63/0869; H04L 9/3273; H04L 9/0866; H04L 9/3231; H04L 9/302; H04L 9/3226; H04L 9/3247; H04L 63/0442; H04L 63/0492; H04L 63/0853; H04L 2209/88; G07C 9/00158; G07C 2209/02; G07C 9/00563; G07C 9/00087; G06Q 20/3674; G06Q 20/3821; G06Q 20/341; G06Q 20/40145; H04W 12/06; H04W 12/08; G05B 2219/24162; G06K 9/00885; G06K 2017/0045; G07F 7/1008
USPC ......... 340/5.52, 5.82, 5.84, 10.5, 10.52, 5.92, 340/568.1, 573.1, 5.61, 10.1, 5.86; 705/7, 705/8, 67, 44; 382/115, 118, 128, 124, 126; 235/379, 380, 381, 382, 375; 342/456, 342/42; 713/186, 161, 169; 380/229, 259
See application file for complete search history.

(56) References Cited

U.S. PATENT DOCUMENTS 5,225,664 A    7/1993    Iijima
5,544,245 A    8/1996    Tsubakiyama
(Continued)

*Primary Examiner* — Mirza Alam
(74) *Attorney, Agent, or Firm* — Norton Rose Fulbright US LLP

(57) ABSTRACT

Systems and methods which provide identification of a user in combination with mutual authentication between a user and identification host are shown. Embodiments further provide mutual authentication between the identification host and a resource for which access is controlled, thereby providing three-party authentication (e.g., user, identification host, resource). Although utilizing biometric data for user identification, embodiments store such biometric information within devices which remain in the control of users. Protocols implemented according to embodiments facilitate a decentralized approach to user identification and authentication to allow a user to interact with any of a number of identification hosts for user identification and authorization. Auditing and tracing of user identification and authentication and/or resource access is provided according to embodiments.

40 Claims, 6 Drawing Sheets

(51) Int. Cl.

| | | |
|---|---|---|
| *G06F 21/00* | (2013.01) | |
| *G07C 9/00* | (2006.01) | |
| *G06F 21/32* | (2013.01) | |
| *H04L 9/08* | (2006.01) | |
| *H04L 29/06* | (2006.01) | |
| *G06Q 20/40* | (2012.01) | |

(56) References Cited

U.S. PATENT DOCUMENTS

| | | | |
|---|---|---|---|
| 5,721,781 A | 2/1998 | Deo et al. | |
| 6,219,439 B1 * | 4/2001 | Burger | 382/115 |
| 6,757,825 B1 | 6/2004 | MacKenzie et al. | |
| 2002/0140542 A1 * | 10/2002 | Prokoski et al. | 340/5.52 |
| 2004/0257197 A1 * | 12/2004 | Beenau et al. | 340/5.53 |
| 2005/0218215 A1 * | 10/2005 | Lauden | 235/380 |
| 2008/0028230 A1 * | 1/2008 | Shatford | 713/186 |
| 2009/0048953 A1 * | 2/2009 | Hazel et al. | 705/35 |
| 2009/0095810 A1 * | 4/2009 | Cannon et al. | 235/380 |
| 2011/0140841 A1 * | 6/2011 | Bona et al. | 340/5.83 |

* cited by examiner

PROXIMITY BASED BIOMETRIC IDENTIFICATION SYSTEMS AND METHODS

TECHNICAL FIELD

The invention relates generally to identification of individuals and, more particularly, to proximity based biometric identification techniques for identification of individuals.

BACKGROUND OF THE INVENTION

There are many situations where reliable identification of an individual is desired. For example, in the medical field procedures are often implemented for requiring authorization by a physician and/or attending nurse for dispensing medication, such as to safeguard the dispensation of controlled substances, to ensure dispensation of proper medications and quantities, etc. Accordingly, a procedure may be established by the medical facility requiring that the physician and the nurse sign orders for dispensing medications. Unfortunately, such signatures are often difficult to read, are relatively easily forged, and require the use of paper or hard copies of the documents being authorized. The foregoing technique requiring signatures of the physician and nurse, therefore, do not provide reliable identification of the authorizing individuals or reliable transaction auditing. Moreover, such techniques requiring the use of paper or hard copies of the documents are not environmentally friendly and are incompatible with a more modern, paperless office.

Another example of situations where reliable identification of an individual is desired is when granting access to various resources for which controlled access is desired. Continuing with the foregoing medical field example, controlled access may be desired with respect to patient records, clinical resource scheduling, etc. Accordingly, procedures may be established by the medical facility whereby each user creates a user name and password for electronically accessing particular applications, such as a patient records database application, a clinical resource scheduling application, etc. Unfortunately, the use of such user names and passwords is often not user friendly. For example, a user is often required to implement multiple layers of user names and passwords, such as one set of user name and password to access a network system and separate sets of user names and passwords to access individual applications available through the network system. Creating, remembering, and managing such user name and password sets, particularly where different applications impose different requirements regarding such user names and passwords, becomes a challenging task for the user. Moreover, the use of such user name and password does nothing to actually provide identification of the user because any individual who acquires the user name and password set may obtain access to the corresponding resource.

One previous technique for providing user identification and/or controlled access to a resource has been to issue radio frequency identification (RFID) cards to users. Accordingly, a user may hold an RFID card near an RFID reader for user identification and/or gaining access to a controlled access resource. Such techniques, however, provide no identification of the user because any individual possessing the RFID card will be identified as the user to which the card was issued. Moreover, the response by the RFID card to a reader inquiry is unchanging, and thus the RFID identification technique is susceptible to replay attacks. For example, an eavesdropper may monitor the communication between the RFID card and RFID reader and thus obtain information from a user's RFID card. This obtained information may subsequently be provided to a RFID reader to "spoof" the identification of the legitimate user. The foregoing replay attack is made even more vulnerable due to there being no authentication of the RFID reader, thereby allowing an imposter RFID reader to readily obtain the RFID card information. Various RFID based identification and/or controlled access techniques further present a weakness in that there is no mutual authentication between the RFID reader and the resource to which access is granted. Thus, even where the RFID identification technique itself operates properly, the technique may be circumvented through interaction with a resource directly.

Another previous technique for providing user identification and/or controlled access to a resource has been to use challenge-response based access control. According to such a technique, a smartcard or other device having processing capability (collectively referred to herein as a smart user device) is used with an identification host (e.g., smartcard reader) to implement a challenge and corresponding response for identification and/or access control. For example, a smart user device and identification host may share a secret key for use in a challenge-response, whereby the identification host provides a challenge message encrypted using the key (e.g., a random number) to a smart user device in communication therewith. In response, the smart user device may use the key to obtain the challenge message, compute a response using the challenge message, and return a response message encrypted using the key. As with the RFID technique discussed above, such a challenge-response technique provides no identification of the user because any individual possessing the smart user device will be identified as the user to which the device was issued. Moreover, the challenge-response is susceptible to a "man-in-the-middle" attack, wherein an unauthorized device is disposed in the communication path between the smart user device and the identification host, passing the challenge and response messages between the smart user device and identification host but intercepting and controlling session data provided thereafter (e.g., taking over interaction with the identification host after the challenge-response). The vulnerability of the challenge-response technique is further exacerbated by there being no authentication of the identification host, thereby allowing an imposter host to issue challenges to a smart user device in an effort to determine the proper challenge-response combination for use in later spoofing the smart user device to a legitimate identification host. Various challenge-response based identification and/or controlled access techniques further present a weakness in that there is no mutual authentication between the identification host and the resource to which access is granted. Thus, even where the challenge-response identification technique itself operates properly, the technique may be circumvented through interaction with a resource directly.

Yet another previous technique for providing user identification and/or controlled access to a resource has been to provide a technique implementing a smartcard reader with fingerprint verification. For example, a terminal may be provided which includes both a smartcard reader and a fingerprint reader which are operated cooperatively to provide user identification and/or resource access control. The smartcard portion of the technique implements a traditional challenge-response technique, as described above, and thus suffers from weaknesses with respect to man-in-the-middle attacks and no identification host authentication. The fingerprint portion of the technique typically implements centralized storage (e.g., identification host or server based storage) of user fingerprint data (e.g., fingerprint exemplars), thereby presenting privacy issues with respect to user biometric data. Moreover, the combined smartcard reader with fingerprint verification techniques present a weakness in that there is no mutual authentication between the terminal and the resource to which access is granted. Thus, even where the smartcard reader with fingerprint verification identification technique itself operates properly, the technique may be circumvented through interaction with a resource directly.

Various authenticated key exchange protocols have been implemented which provide mutual authentication between two systems. For example, International Standards Organization (ISO) (e.g., ISO/IEC 9798), sign and MAC (SIGMA), just fast keying (JFK), Diffie-Hellman (D-H), secret key exquisite mutual encryption (SKEME) (public key encryption D-H protocol), and high-performance Menezes, Qu, and Vanstone (HMQV) (high-performance secure D-H protocol), authenticated key exchange protocols have been implemented to provide mutual authentication. These authenticated key exchange protocols, however, do not provide for identification of a user, but rather authenticate the devices implementing the key exchange protocols. Systems implementing such mutual authentication protocols are shown in U.S. Pat. No. 5,225,664 to Iijima, U.S. Pat. No. 5,721,781 to Deo, et al., U.S. Pat. No. 5,544,245 to Tsubakiyama, and U.S. Pat. No. 6,757,825 to MacKenzie, et al. None of these systems set forth a solution providing a combination of user authentication, server authentication, user identification, and mutual authentication between an identification host and a resource for which access is controlled. For example, Iijima provides only for mutual authentication, Deo et al. provides public key based authentication of smartcard transactions with no specific mutual authentication protocol and no biometric user information, Tsubakinyama only provides mutual authentication between two entities using symmetric key encryption, and MacKenzi et al. provides a public key based mutual network authentication protocol for two parties.

BRIEF SUMMARY OF THE INVENTION

The present invention is directed to systems and methods which provide identification of a user in combination with mutual authentication between a user and identification host. Accordingly, embodiments implement a two-factor authentication technique for user identification and authentication, wherein the factors used include something the user is (e.g., biometric data) and something the user possesses (e.g., smart user device). Information regarding something the user is (e.g., biometric data, such as fingerprint, iris print, retina print, voice print, DNA, etc.) is stored in systems remaining in the possession of the user (e.g., the something the user possess, such as a smart user device). Embodiments of the invention thus not only avoid particular issues with respect to the storage of such highly personal information (e.g., privacy issues), but facilitate a decentralized approach to user identification and authentication. In operation according to such decentralized embodiments of the invention, a user may interact with any of a number of identification hosts (e.g., identification hosts which have not been provisioned a priori for use by the particular user) for user identification and authorization herein.

In addition to providing user identification and authorization, embodiments further provide mutual authentication between the identification host and a resource for which access is controlled, thereby providing three-party authentication (e.g., user, identification host, resource). Accordingly, an identification host of embodiments of the invention may be assured of the particular resource for which controlled access is provided, to which user credentials are provided, etc.

Auditing and tracing of user identification and authentication and/or resource access may be reliably provided according to embodiments of the invention. For example, a transcript of the process of user identification and authentication and/or resource authentication may be logged to facilitate auditing and tracking.

In an exemplary embodiment, a contactless smart user device (e.g., smartcard, processor-based dongle, etc.) is utilized in providing biometric identification of a user and authentication with respect to the user. An identification host having an appropriate smart device reader and biometric sensor of embodiments operates to provide mutual authentication with respect to the smart user device and, using biometric sensor data and exemplary biometric data provided by the authenticated smart user device, identify and authenticate the user. Where the user is seeking access to a resource (e.g., a particular application), the identification host of embodiments mutually authenticates the resource. Thereafter, the identification host may facilitate user access to the resource, such as by passing user access credentials thereto (e.g., user name and password stored by the identification host, the smart user device, etc.). Accordingly, embodiments of the invention may be utilized to provide controlled access with respect to one or more resources in a user friendly manner (e.g., without necessitating a user memorizing one or more sets of user credentials) while providing reliable user identification and authentication and facilitating auditing and tracing functionality.

User identification and authentication provided according to embodiments of the invention may be utilized in situations other than for providing controlled access to one or more resource directly to the user thereof. For example, embodiments may be utilized to provide endorsement (e.g., signing, executing, approving, etc.) of documents, wherein the user's identity is assured. In operation according to an embodiment, a physician carrying the aforementioned contactless smart user device and wishing to endorse a document (e.g., report, order, a negotiable instrument, etc.) may interface with an appropriate identification host to provide biometric information (e.g., fingerprint), whereby the identification host interacts with the smart user device to identify and authenticate the physician using the biometric information. The identification host may further operate according to the foregoing protocol to mutually authenticate an application system providing a document endorsement function. Thereafter, the document may be provided with an appropriate endorsement (e.g., electronic signature having authenticating features therein) of the physician, thereby providing reliable user identification and authentication and facilitating auditing and tracing functionality. Accordingly, although implementing controlled access with respect to an endorsement application, operation of the user identification and authentication is provided for the reliable and trustworthy endorsement of the document rather than for providing access with respect to a resource to a user.

It should be appreciated that the foregoing scenarios for the use of user identification and authentication are merely exemplary and that the concepts herein have applicability beyond such examples. For example, other scenarios in which user identification and authentication provided according to embodiments of the invention may be utilized include user activity timestamping (e.g., worker time clock applications) and communication of data between devices (e.g., communication of user data from a user device to another device).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
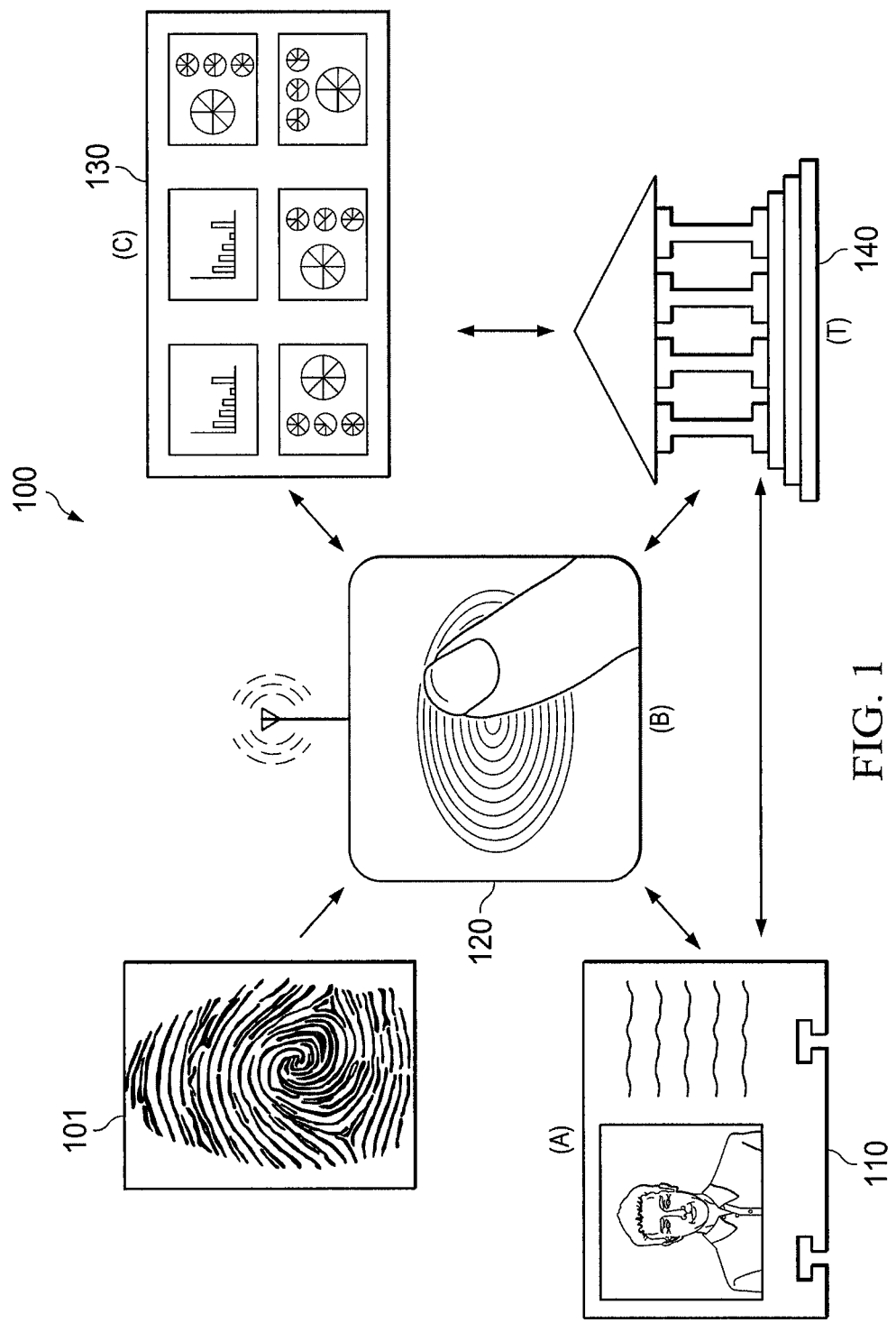
FIG. 1 shows a high level block diagram of an identification and authentication system adapted according to embodiments of the invention.

FIG. 1 shows a high level block diagram of a identification and authentication system adapted according to embodiments of the invention. Specifically, system 100 of the illustrated embodiment includes identification host 120 operable in cooperation with smart user device 110 to use biometric information 101 in identifying and authenticating a user (not shown). In operation smart user device 110, such as may be issued to the user by authority 140, is carried by the user when engaging identification host 120, whereby identification host 120 authenticates smart user device 110, collects biometric information 101 from the user, and uses biometric information 101 in cooperation with authenticated smart user device 110 to identify and authenticate the user.

The foregoing identification and authentication of the user may be utilized by identification host 120 in providing controlled access with respect to the user to one or more resources, such as applications of application system 130. Accordingly, identification host 120 of embodiments operates in cooperation with application system 130 to provide mutual authentication. Granting of user access to applications of application system 130, such as by providing user credentials thereto, may thus be confidently undertaken according to embodiments of the invention.

Figure 2:
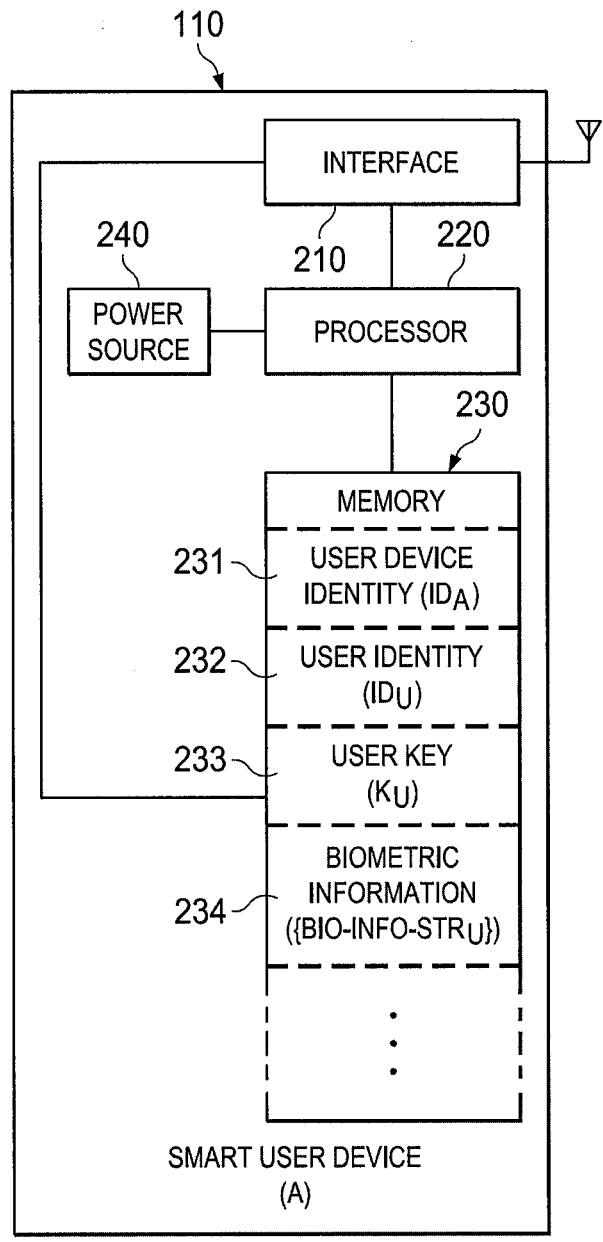
FIG. 2 shows a block diagram of embodiments of a smart user device as may be used in the identification and authentication system of FIG. 1.

Directing attention to FIG. 2, detail with respect to an embodiment of smart user device 110 is shown. Specifically, FIG. 2 shows a high level block diagram of an embodiment of smart user device 110. It should be appreciated that smart user device 110 of the illustrated embodiment may comprise a number of form factors, such as a wireless dongle configuration, a smartcard type configuration, a universal serial buss (USB) dongle, a touch memory configuration, a processor-based module configuration, etc.

The illustrated embodiment of smart user device 110 comprises a plurality of components, shown here as including interface 210, processor 220, memory 230, and power source 240. Embodiments of smart user device 110 may include different and/or alternative components useful for providing operation as described herein.

Interface 210 of embodiments provides a communication interface suitable for communications between smart user device 110 and identification host 120 as described herein. Interface 210 may comprise a wireless interface (e.g., a proximity based wireless interface such as a proximity resonant energy wireless interface, a short range wireless interface such as a BLUETOOTH or ZIGBEE wireless interface, a medium range wireless interface such as a wireless local area network (WLAN) wireless interface, a relatively long range wireless interface such as a cellular, Global System for Mobile Communications (GSM), or International Mobile Telecommunications-2000 (3G) wireless interface, etc.). Interface 210 may additionally or alternatively comprise a wired interface (e.g., a USB interface, an Ethernet interface, a FIREWIRE interface, etc.). Interface 210 may comprise interfaces in addition to or in the alternative to those examples given, whether wired, wireless, or utilizing other media, such as an optical interface infrared (IR) interface, a fiber optic interface, etc. The communications provided by interface 210 of embodiments, irrespective of the particular technology used or medium through which the communications are accomplished, are preferably bidirectional, of sufficient bandwidth, and sufficiently robust to accommodate communication of identification and authentication information for embodiments as described herein.

Interface 210 of embodiments may provide interface functionality in addition to or in the alternative to the aforementioned communication interface suitable for communications between smart user device 110 and identification host 120. For example, interface 210 may provide a user interface, such as to provide information (e.g., light, audio, information display, etc.) regarding the status of smart user device 110, the status of user identification and authorization, the status of a communication link, etc. A user interface may include the ability for a user to provide input to and/or control of smart user device 110, such as by providing a user controllable switch to allow the user to disable smart user device 110 and thereby prevent its unintended or undesired communication with an external system (e.g., identification host).

Processor 220 may comprise a general purpose processor (e.g., a central processing unit operable under control of an instruction set to define operation according to embodiments described herein) or a special purpose processor (e.g., an application specific integrated circuit (ASIC) operable to provide operation according to embodiments described herein). Irrespective of the particular processor configuration used, embodiments of processor 220 provide operation to implement communications protocols described herein, to control access to at least portions of memory 230, and to provide cryptographic operations.

Memory 230 may comprise various forms of memory providing data storage suitable for use in user identification and authentication as described herein. For example, memory 230 may comprise random access memory (RAM), read only memory (ROM), flash memory, magnetic memory, optical memory, etc. Irrespective of the particular memory configuration used, memory 230 of embodiments provides controlled, tamper resistant storage (through cooperative operation of processor 220 of embodiments) of data used in user identification and authentication as described herein. For example, the illustrated embodiment of memory 230 comprises user device identity data 231 ($ID_A$) providing substantially unique (substantially unique as used herein being unique within the typical operation of system 100) identification of smart user device 110, user identity data 232 ($ID_U$) providing substantially unique identification of the user to which smart user device 110 is assigned, user key data 233 ($K_U$) providing one or more cryptographic key for use in identification/authentication protocols, and biometric information data 234 (bio-info-$str_U$). Any or all such data may be encrypted, such as by processor 220 using key data 233, for storage by memory 230 (as indicated herein by the use of "{ }" brackets).

It should be appreciated that additional or alternative data useful for providing user identification and/or authentication may be stored by memory 230 of embodiments. For example, embodiments of smart user device 110 may store a plurality of biometric information data in memory 230. Such biometric information data may comprise biometric data streams for a biometric attribute (e.g., fingerprint) sampled using different sensors (e.g., full fingerprint scanner, strip fingerprint reader, optical fingerprint scanner, ultrasonic fingerprint scanner, etc.) to facilitate user identification and authentication using any of a number of identification host configurations using different biometric sensor configurations for sensing the biometric attribute. Additionally or alternatively, such biometric information data may comprise biometric data streams for different biometric attributes (e.g., fingerprint, iris print, retina print, voice print, etc.) to facilitate user identification and authentication using any of a number of identification host configurations using different biometric sensors and/or for identification of a user through a plurality of biometric attributes.

Another example of additional data that may be stored by memory 230 is user credentials. For example, user credentials such as user name and password sets useful with respect to an application for which controlled access is provided may be stored by memory 230 for passing to application system 130 upon completion of user identification and authentication processing by and between smart user device 110, identification host 120, and application system 130.

Power source 240 may comprise any of a number of configurations suitable for providing appropriate power to the components of smart user device 110. For example, power source 240 may comprise a battery for autonomously powering interface 210, processor 220, and memory 230 for user identification and authentication operation. Such a battery may provide power reserves sufficient to operate the components of smart user device 110 autonomously for a desired period of time (e.g., minutes, days, weeks, years, etc.) and may be replaceable and/or rechargeable. Power source 240 may comprise circuitry (e.g., coil, rectifier, temporary power store, etc.) for inductive or parasitic power acquisition from a host to power interface 210, processor 220, and memory 230 for user identification and authentication operation. Additionally or alternatively, power source 240 may comprise circuitry (e.g., power interface components, voltage and/or current regulators, etc.) for direct power acquisition from a host to power interface 210, processor 220, and memory 230 for user identification and authentication operation. Such a battery, inductive power acquisition circuit, and/or direct power acquisition circuit may be used in combinations of one or more such other circuits in order to facilitate robust and long lived operation of smart user device 110 of embodiments.

Interface 210, processor 220, and memory 230 are preferably operable to provide the foregoing functions at speeds suitable for facilitating user identification and authentication processing as described herein. Moreover, interface 210, processor 220, and memory 230 are preferably adapted to perform such functionality within the power supply capabilities of power source 240 such that a desired level of smart user device longevity and/or autonomy is ensured.

Figure 3:
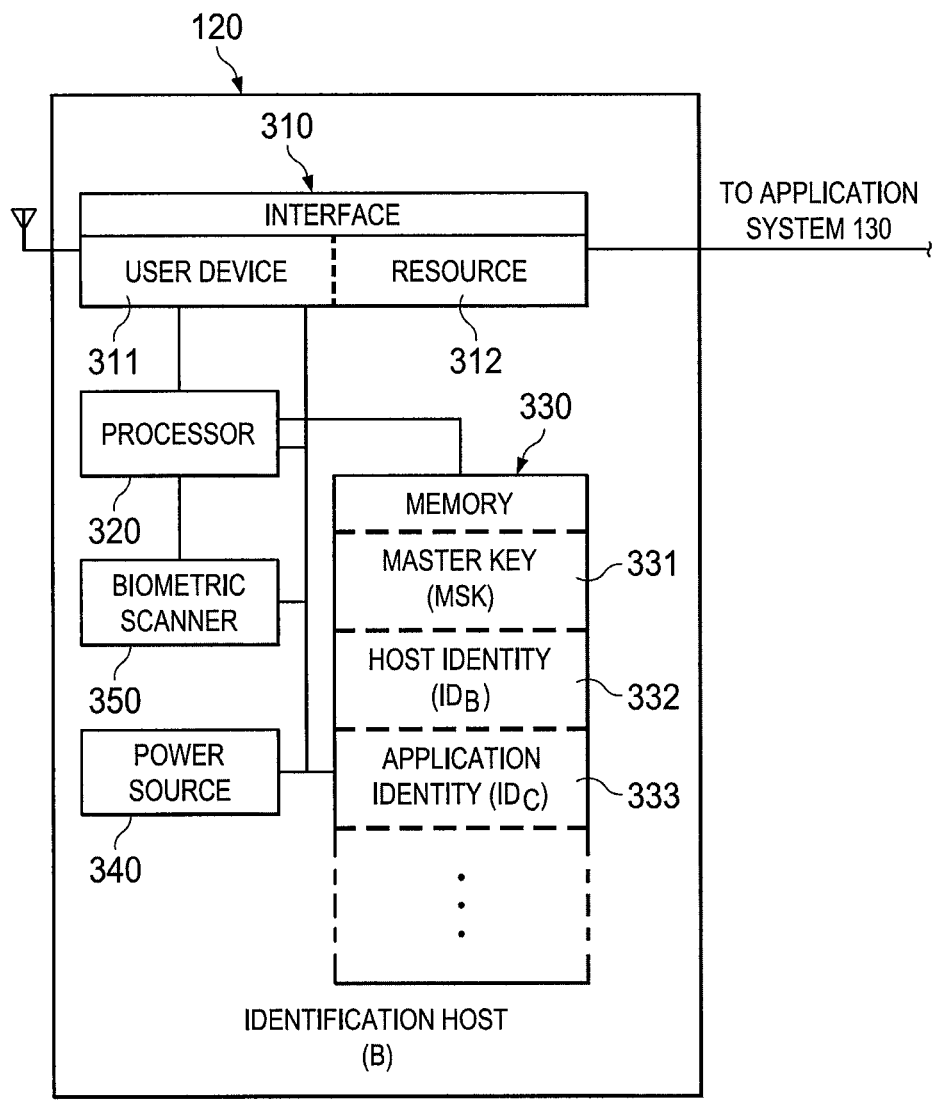
FIG. 3 shows a block diagram of embodiments of an identification host as may be used in the identification and authentication system of FIG. 1.

Directing attention to FIG. 3, detail with respect to an embodiment of identification host 120 is shown. Specifically, FIG. 3 shows a high level block diagram of an embodiment of identification host 120. It should be appreciated that identification host 120 of the illustrated embodiment may comprise a number of form factors, such as an interface integrated into a user terminal or system hosting one or more applications for which controlled access is provided, a stand alone module in communication with one or more systems for which controlled access is provided, an appliqué for a user terminal or other system, etc.

The illustrated embodiment of identification host 120 comprises a plurality of components, shown here as including interface 310, processor 320, memory 330, power source 340, and biometric scanner 350. Embodiments of identification host 120 may include different and/or alternative components useful for providing operation as described herein. For example, identification host 120 of embodiments may comprise an internal clock (e.g., a clock maintaining time in seconds) for the purpose of log keeping.

Interface 310 of embodiments provides a communication interface suitable for communications between identification host 120 and both smart user device 110 and application system 130 as described herein. Accordingly, interface 310 of the illustrated embodiment comprises user device interface 311 adapted for providing communication with smart user device 110 and resource interface 312 adapted for providing communication with application system 130. User device interface 311 and/or resource interface 312 of interface 310 may comprise a wireless interface (e.g., a proximity based wireless interface such as a proximity resonant energy wireless interface, a short range wireless interface such as a BLUETOOTH or ZIGBEE wireless interface, a medium range wireless interface such as a WLAN wireless interface, a relatively long range wireless interface such as a cellular, GSM, or 3G wireless interface, etc.). User device interface 311 and/or resource interface 312 of interface 310 may additionally or alternatively comprise a wired interface (e.g., a USB interface, an Ethernet interface, an Internet interface, a FIREWIRE interface, etc.). In accordance with an exemplary embodiment, user device interface 311 may comprise a wireless interface for facilitating the use of a contactless configuration of smart user device 110 and resource interface 312 may comprise a wired interface for facilitating the use of a network server configuration of application system 130.

User device interface 311 and/or resource interface 312 of interface 310 may comprise interfaces in addition to or in the alternative to those examples given above, whether wired, wireless, or utilizing other media, such as an optical interface infrared (IR) interface, a fiber optic interface, etc. The communications provided by interface 310 of embodiments, irrespective of the particular technology used or medium through which the communications are accomplished, are preferably bidirectional, of sufficient bandwidth, and sufficiently robust to accommodate communication of identification and authentication information for embodiments as described herein.

Interface 310 of embodiments may provide interface functionality in addition to or in the alternative to the aforementioned communication interface suitable for communications between identification host 120 and smart user device 110 and application system 130. For example, interface 310 may provide a user interface, such as to provide information (e.g., light, audio, information display, etc.) regarding the status of identification host 120, the status of user identification and authorization, the status of a communication link, etc. A user interface may include the ability for a user to provide input to and/or control of identification host 120, such as by providing a user control to allow the user to initiate user identification and/or authentication operation.

Processor 320 may comprise a general purpose processor (e.g., a central processing unit operable under control of an instruction set to define operation according to embodiments described herein) or a special purpose processor (e.g., an ASIC operable to provide operation according to embodiments described herein). Irrespective of the particular processor configuration used, embodiments of processor 320 provide operation to implement communications protocols described herein, to control access to at least portions of memory 330, and to provide cryptographic operations.

Memory 330 may comprise various forms of memory providing data storage suitable for use in user identification and authentication as described herein. For example, memory 330 may comprise RAM, ROM, flash memory, magnetic memory, optical memory, etc. Irrespective of the particular memory configuration used, memory 330 of embodiments provides controlled, tamper resistant storage (through cooperative operation of processor 320 of embodiments) of data used in user identification and authentication as described herein. For example, the illustrated embodiment of memory 330 comprises master secret key data 331 (MSK) providing a master key from which other data is generated (e.g., user key data ($K_U$), user identity data ($ID_U$), etc.), host identity data 332 ($ID_B$) providing substantially unique identification of identification host 120, application identification data 333 ($ID_C$) providing substantially unique identification of application system 130 with respect to which controlled access is to be provided. Any or all such data may be encrypted, such as by processor 320 using master secret key data 331, for storage by memory 330.

It should be appreciated that additional or alternative data useful for providing user identification and/or authentication may be stored by memory 330 of embodiments. For example, embodiments of identification host 120 may store a plurality of data sets (e.g., host identity data, and/or application identity data, wherein the master secret key data may be used for multiple applications or different master secret key data may be provided for different applications) associated with different applications to which controlled access is to be provided.

In operation according to embodiments of the invention, the use of application identification data 333 links identification host system to application system 130 for user identification and authentication processing. However, as will be better appreciated from the discussion regarding operation of embodiments herein, configurations of identification host 130 herein are not a priori linked to particular users/smart user devices. Therefore, identification host 130 may be utilized in providing user identification and authentication with respect to any user possessing an appropriate smart user device.

Power source 340 may comprise any of a number of configurations suitable for providing appropriate power to the components of identification host 120 and, in some embodiments, smart user device 110. For example, power source 340 may comprise circuitry (e.g., line power interface) for direct power acquisition from building mains for powering interface 310, processor 320, memory 330, and biometric sensor 350 for user identification and authentication operation. Similarly, power source 340 may comprise circuitry (e.g., power interface components, voltage and/or current regulators, etc.) for direct power acquisition from a system to which identification host 130 is attached (e.g., a system to which identification host 130 is an appliqué). Additionally or alternatively, power source 340 may comprise a battery for autonomously powering interface 310, processor 320, memory 330, and biometric sensor 350 for user identification and authentication operation. Power source 340 may comprise circuitry for providing power to other devices, such as smart user device 110, either directly (e.g., using power interface components, voltage and/or current regulators, etc.) or indirectly (e.g., using a coil for inductive power transmission). Such a battery, inductive power acquisition circuit, and/or direct power acquisition circuit may be used in combinations of one or more such other circuits in order to facilitate robust operation of identification host 120 of embodiments.

Biometric scanner 350 comprises one or more biometric scanner circuits operable to collect data regarding biometric samples provided by a user during user identification and authentication operation. For example, biometric scanner 350 may comprise one or more fingerprint scanner (e.g., full fingerprint optical scanner, strip fingerprint optical scanner, ultrasonic fingerprint scanner, etc.). Additionally or alternatively, biometric scanner 350 may comprise one or more iris scanner, retina scanner, voice scanner, DNA scanner, and/or the like.

Interface 310, processor 320, memory 330, and biometric scanner 350 are preferably operable to provide the foregoing functions at speeds suitable for facilitating user identification and authentication processing as described herein. Moreover, interface 310, processor 320, memory 330, and biometric scanner 350 are preferably adapted to operate cooperatively with respect to smart user device 110 and application system 130 to provide user identification and/or authentication operation as described herein.

Figure 4:
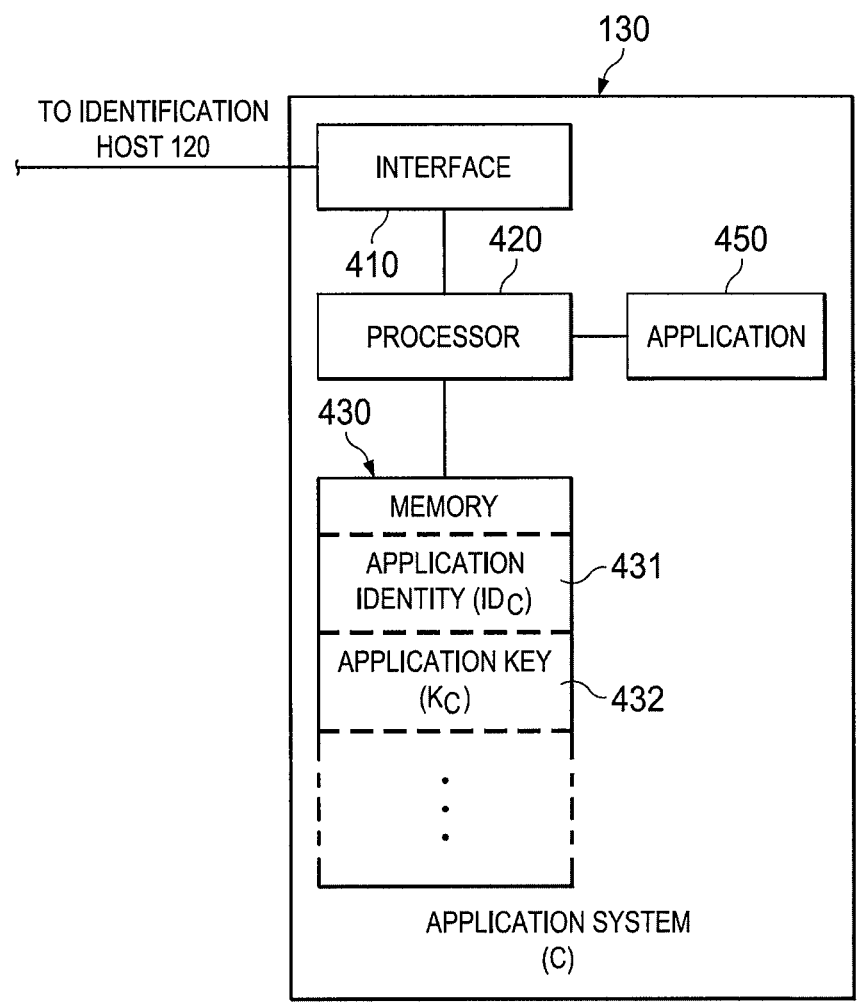
FIG. 4 shows a block diagram of embodiments of an application system as may be used in the identification and authentication system of FIG. 1.

Directing attention to FIG. 4, detail with respect to an embodiment of application system 130 is shown. Specifically, FIG. 4 shows a high level block diagram of an embodiment of application system 130. It should be appreciated that application system 130 of the illustrated embodiment may comprise a number of form factors, such as one or more network based application servers, a stand alone application processing system, an application processing system integrated with identification host 120, etc.

The illustrated embodiment of application system 130 comprises a plurality of components, shown here as including interface 410, processor 420, memory 430, and biometric scanner 450. Embodiments of application system 130 may include different and/or alternative components useful for providing operation as described herein. For example, although not shown in the illustrated embodiment for simplification, application system 130 of embodiments comprises a power source, such as a battery, line power circuit, etc.

Interface 410 of embodiments provides a communication interface suitable for communications between application system 130 and identification host 120 as described herein. Interface 410 may comprise a wireless interface (e.g., a proximity based wireless interface such as a proximity resonant energy wireless interface, a short range wireless interface such as a BLUETOOTH or ZIGBEE wireless interface, a medium range wireless interface such as a WLAN wireless interface, a relatively long range wireless interface such as a cellular, GSM, or 3G wireless interface, etc.). Interface 410 may additionally or alternatively comprise a wired interface (e.g., a USB interface, an Ethernet interface, an Internet interface, a FIREWIRE interface, etc.). Interface 410 may comprise interfaces in addition to or in the alternative to those examples given above, whether wired, wireless, or utilizing other media, such as an optical interface infrared (IR) interface, a fiber optic interface, etc. The communications provided by interface 410 of embodiments, irrespective of the particular technology used or medium through which the communications are accomplished, are preferably bidirectional, of sufficient bandwidth, and sufficiently robust to accommodate communication of identification and authentication information for embodiments as described herein.

Interface 410 of embodiments may provide interface functionality in addition to or in the alternative to the aforementioned communication interface suitable for communications between application system 130 and identification host 120. For example, interface 410 may provide a user interface, such as to provide user interaction with application 450 subsequent to user identification and authentication operation by and between smart user device 110, identification host 120, and application system 130.

Processor 420 may comprise a general purpose processor (e.g., a central processing unit operable under control of an instruction set to define operation according to embodiments described herein) or a special purpose processor (e.g., an ASIC operable to provide operation according to embodiments described herein). For example, processor 420 may comprise an application server processor operable to provide processing of one or more applications of application system 130 in addition to operation for user identification and/or authentication herein. Alternatively, processor 420 may comprise a processor separate from a processor providing operational processing of one or more applications of application system 130. Irrespective of the particular processor configuration used, embodiments of processor 420 provide operation to implement communications protocols described herein, to control access to at least portions of memory 430, and to provide cryptographic operations.

Memory 430 may comprise various forms of memory providing data storage suitable for use in user identification and authentication as described herein. For example, memory 430 may comprise RAM, ROM, flash memory, magnetic memory, optical memory, etc. Irrespective of the particular memory configuration used, memory 430 of embodiments provides controlled, tamper resistant storage (through cooperative operation of processor 420 of embodiments) of data used in user identification and authentication as described herein. For example, the illustrated embodiment of memory 430 comprises application identity data 431 ($ID_C$) corresponding to application identity data 333 of FIG. 3, and application key data 432 ($K_C$) providing one or more cryptographic key for use in identification/authentication protocols. Any or all such data may be encrypted, such as by processor 420 using application key data 432, for storage by memory 430.

It should be appreciated that additional or alternative data useful for providing user identification and/or authentication may be stored by memory 430 of embodiments. For example, embodiments of application system 130 may store a plurality of data sets (e.g., application key data and/or application identity data) associated with different user identification and authentication protocols.

Application 450 comprises one or more application access control is provided by user identification and/or authentication processing of embodiments. It should be appreciated that application 450 may comprise an application to which a user desires to be provided access (e.g., an application with which the user may interact, subsequent to user identification and authentication herein, to perform one or more functions). Additionally or alternatively, application 450 may comprise an application to which access control is provided by operation of user identification and authentication herein, but which the user does not specifically desire access (e.g., an endorsement application, wherein the user only wishes to endorse a document and does not specifically desire to interact with the application facilitating the document endorsement).

Interface 410, processor 420, memory 430, and application 450 are preferably operable to provide the foregoing functions at speeds suitable for facilitating user identification and authentication processing as described herein. Moreover, interface 410, processor 420, and memory 430 are preferably adapted to operate cooperatively with respect to smart user device 110 and/or identification host 120 to provide user identification and/or authentication operation as described herein. It should be appreciated that embodiments of application 450 may or may not be adapted to operate cooperatively with respect to smart user device 110 and/or identification host 120. For example, interface 410 processor 420 and memory 430 may be provided as an appliqué or other front end to application 450, whereby application 450 operates in an unmodified manner to accept user credentials (e.g., conventional user name and password) from smart user device 110 through identification host 120 subsequent to user identification and authorization herein. Alternatively, application 450 may be specifically adapted operate cooperatively with smart user device 110 and/or identification host 120 to provide appropriate access thereto subsequent to user identification and authentication.

Figure 5:
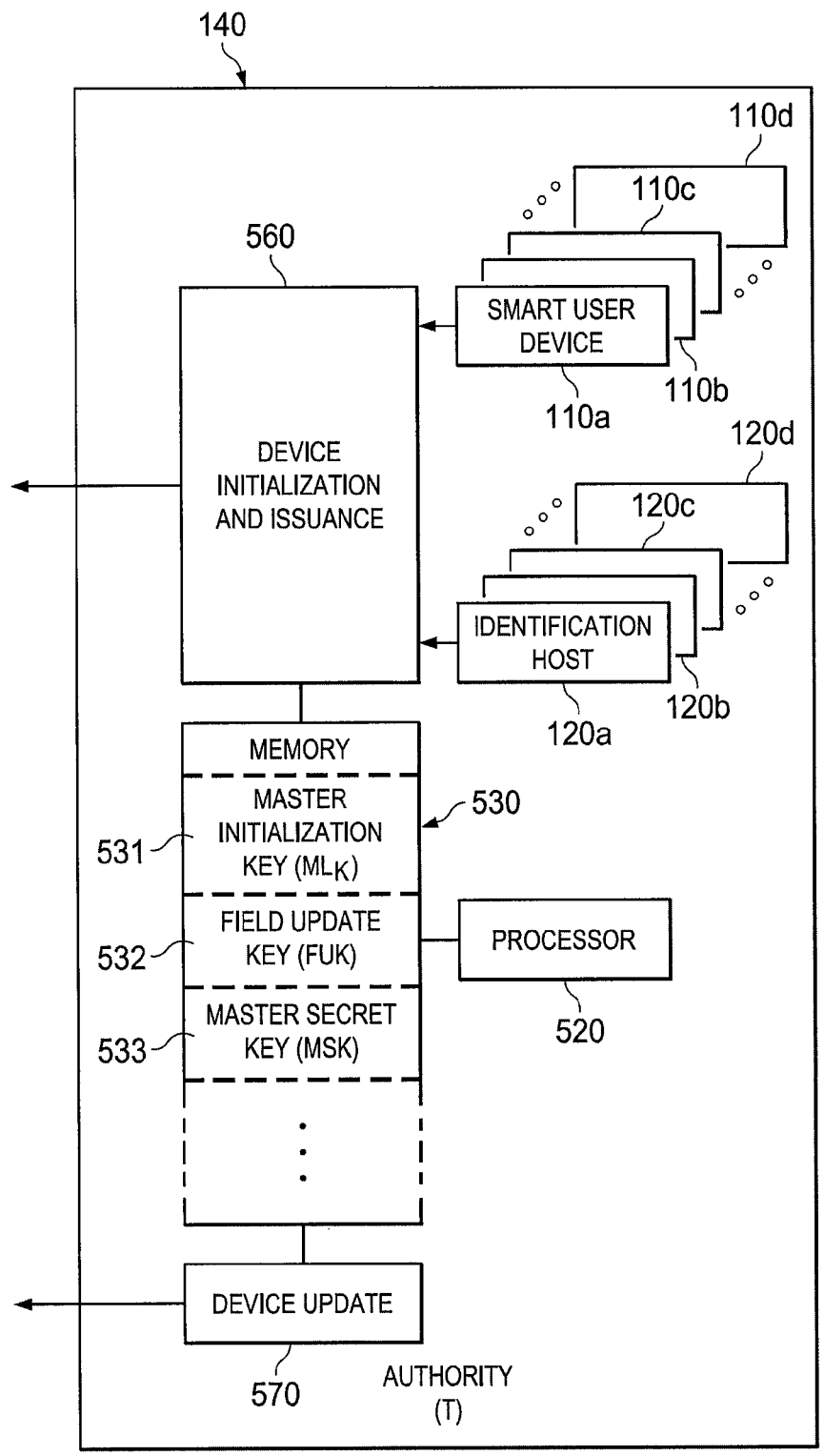
FIG. 5 shows a block diagram of embodiments of an authority as may be used in the identification and authentication system of FIG. 1.

Directing attention to FIG. 5, detail with respect to an embodiment of authority 140 is shown. Specifically, FIG. 5 shows a high level block diagram of an embodiment of authority 140. It should be appreciated that authority 140 of the illustrated embodiment may comprise a number of form factors, such as one or more network based authority servers, distributed among one or more of identification host 120, application system 130, and/or authority 140, etc.

The illustrated embodiment of authority 140 comprises a plurality of functions, shown here as including processor 520, memory 530, device initialization and issuance 560, and device update 570. Embodiments of authority 140 may include different and/or alternative functions useful for providing operation as described herein.

Processor 520 may comprise a general purpose processor (e.g., a central processing unit operable under control of an instruction set to define operation according to embodiments described herein) or a special purpose processor (e.g., an ASIC operable to provide operation according to embodiments described herein). For example, processor 520 may comprise a processor operable to provide processing of one or more aspect of user identification and authentication herein. Additionally or alternatively, processor 520 may comprise a processor dedicated to processing by authority 140. Irrespective of the particular processor configuration used, embodiments of processor 520 provide operation as described herein.

Specifically, processor 520 of embodiments operates to generate key data, identification data, and/or the like used in user identification and authentication protocols herein.

Memory 530 may comprise various forms of memory providing data storage suitable for use in device initialization, issuance, and update as described herein. For example, memory 530 may comprise RAM, ROM, flash memory, magnetic memory, optical memory, etc. Irrespective of the particular memory configuration used, memory 530 of embodiments provides controlled, tamper resistant storage (through cooperative operation of processor 520 of embodiments) of data used in device initialization, issuance, and update as described herein. For example, the illustrated embodiment of memory 530 comprises master initialization key data 531 (MIK) used in initializing smart user devices 110a-110d to operate as smart user device 110 and/or identification hosts 120a-120d to operate as identification host 120, field update key data 532 (FUK) used in updating issued ones of smart user device 110 and/or identification host 120, and master secret key data 533 (MSK) corresponding to master secret key data 331 of FIG. 3. Any or all such data may be encrypted, such as by processor 520 using application key data 532, for storage by memory 530.

It should be appreciated that additional or alternative data useful for providing device initialization, issuance, and update may be stored by memory 530 of embodiments. For example, embodiments of authority 140 may store user device identity data 231, user identity data 232, user key data 233, host identity data 332, application identity data 333, 431, and/or application key data 432 in memory 530 for use in initialization, issuance, and update of smart user device 110, identification host 120, and/or application system 130.

Device initialization and issuance 560 of embodiments operates to initialize ones of smart user devices 110a-110d and assign an appropriately initialized smart user device (e.g., smart user device 110) to a user. Similarly, device initialization and issuance 560 of embodiments operates to initialize ones of identification hosts 120a-120d and to link an appropriately initialized identification host (e.g., identification host 120) with one or more application (e.g., application 450) for which controlled access is to be provided. Embodiments of device initialization and issuance 560 further operate to initialize or otherwise prepare one or more application system (e.g., application system 130) for application access control herein. As will be better understood by the discussion below, device initialization and issuance 560 of embodiments (e.g., operating under control of processor 520) utilizes master initialization key 531 and/or field update key 532 to initialize smart user device 110 with particular information such as user device identity data 231, user identity data 232, and user key 233, to initialize identification host 120 with particular information such as master key data 331, host identity data 333, and application identity data 333, and/or to initialize application system 130 with particular information such as application identity data 431 and application key data 432.

Device update 570 of embodiments operates to update issued ones of smart user device 110, identification host 120, and/or application system 130. As will be better understood by the discussion below, device update 570 of embodiments (e.g., operating under control of processor 520) utilizes field update key 532 to update user key data 233 of smart user device 110, to update master key data 331 of identification host 120, and/or to update application key data 432 of application system 130.

In operation according to embodiments, master initialization key data 531 and field update key data 532 are different. Accordingly, authority 140 may essentially be provided by separate entities having different levels of authority. For example, an initialization entity possessing master initialization key data 531 has the authority to establish and change both identification data (e.g., user identification data, host identity data, and application identity data) and key data (e.g., master key data, user key data, and application key data) consistent with initialization of such devices. However, an issuing/update entity possessing field update key data 532 has the authority to establish and change identification data (e.g., user identification data, host identity data, and application identity data) consistent with issuance, updating, and/or maintaining such devices.

To aid in understanding user identification and authentication operation according to embodiments, details with respect to particular implementations are provided below. It should be appreciated that the concepts of the present invention are not limited to the particular values, algorithms, steps, etc. set forth in these exemplary implementations.

In the exemplary implementations described below, let U be a user for which user identification and authorization according to the concepts herein is provided, A be a smart user device (e.g., smart user device 110) associated with user U. Let B be an identification host (e.g., identification host 120) operable with smart user device A to provide user identification and authorization processing. Let C be an application system (e.g., application system 130) operable with identification host B to provide user identification and authorization processing. Let T be an authority (e.g., authority 140) operable to provide key data, identification data, and/or associations used in user identification and authorization. Also, let $H_1: \{0,1\}^k \times \{0,1\}^k \rightarrow \{0,1\}^k$ be a pseudorandom function, $H_2: \{0,1\}^k \times \{0,1\}^{5k} \rightarrow \{0,1\}^{2k}$ be another and distinct pseudorandom function, $\{M\}_K$ represent the symmetric key encryption of a message $M \in \{0,1\}^*$ under key $K \in \{0,1\}^k$, and Tag←MAC(K, M) be a message authentication code on message $M \in \{0,1\}^*$ under key $K \in \{0,1\}^k$. The foregoing user U, smart user device A, identification host B, application system C, and authority T may cooperate, using the foregoing algorithms, in accordance with the following protocols to provide operation according to embodiments of the invention.

For user identification and authentication system initialization, authority T of embodiments preferably has the master keys, master initialization key $MIK \in_R \{0,1\}^k$ (e.g., MIK 531) and field update key $FUK \in_R \{0,1\}^k$ (e.g., FUK 532), providing access to the tamper resistant memories of smart user device A, identification host B, and application system C. Authority T also preferably has the master secret key (e.g., MSK 331, 533) used in user identification and authentication processing.

In providing user registration and smart user device issuance, authority T of embodiments obtains user identity information (e.g., full name, nickname, government issued identification, and/or the like) and biometric information (e.g., one or more biometric samples, perhaps using different biometric sensor configurations, such as fingerprints, iris prints, retina prints, voice prints, DNA, and/or the like) from user U. Authority T computes user identity $ID_U \in \{0,1\}^k$ from the identity information, wherein k∈N is a security parameter (e.g. k=128 representing 128-bit symmetric key level security). Authority T of embodiments also computes user secret key $K_U = H_1(MSK, ID_U)$. Additionally, authority T of embodiments computes biometric information data bio-info-str$_U \in \{0,1\}^n$ (e.g., bio-info-str$_U$ 234), wherein the biometric information data is an n-bit (e.g., the value n may be a few hundred bits) string representing the biometric information (e.g. fingerprint reference image) of user U. User device identity $ID_A \in \{0,1\}^k$ for smart user device A, such as using a serial number of the smart user device (e.g., smartcard electronic serial number).

Authority T preferably writes the data $ID_A$, $ID_U$, $K_U$, and $\{\text{bio-info-str}_U\}_{K_u}$ into smart user device A (e.g., into memory 230). User key $K_U$ is preferably stored in tamper-resistant portion of the memory area of A, whereas user identity $ID_U$, user device identity $ID_A$, and encrypted biometric information $\{\text{bio-info-str}_U\}_{K_u}$ may be stored in a portion of memory that is not tamper-resistant according to embodiments. User key $K_U$ is utilized in algorithms to provide identification and/or authentication and thus is protected from tampering by storage in a tamper-resistant memory area of the smart user device according to embodiments. In operation according to embodiments, master initialization key MIK is utilized for accessing the aforementioned tamper-resistant memory.

Smart user device A is issued to user U (e.g., by authority 140) for user in user identification and authentication processing according to embodiments. The information stored in smart user device A of embodiments as possessed by user U thus includes $ID_A$, $ID_U$, $K_U$, and $\{\text{bio-info-str}_U\}_{K_u}$.

In providing identification host and application system initialization, authority T obtains application identity information (e.g., MAC address, serial number, network interface card address, and/or the like) from application system C. Authority T computes application identity $ID_C$ from the identity information. Authority T of embodiments also computes application key $K_C = H_1(MSK, ID_C)$. Application system C is preferably issued (e.g., by authority 140) application identity $ID_C$ and application key $K_C$ in a secure manner. For example, authority T may transmit application key $K_C$ and application identity $ID_C$ to application C using a secure communication channel. Alternatively, application key $K_C$ and application identity $ID_C$ may be provided to application system C directly, such as through use of a flash memory module or other memory directly connectable to application system C. Application key $K_C$ is utilized in algorithms to provide identification and/or authentication and thus is protected from tampering by storage in a tamper-resistant memory area of the application system according to embodiments. In operation according to embodiments, master initialization key MIK is utilized for accessing the aforementioned tamper-resistant memory.

Authority T also computes host identity $ID_B$ from host identity information (e.g., MAC address, serial number, network interface card address, and/or the like). Identification host B is preferably associated (e.g., by authority 140) with one or more application system, such as application system C. Accordingly, identification host B of embodiments is initialized (e.g., by authority 140) to store (e.g., within tamper resistant memory 330) not only host identity $ID_B$ but also application identity $ID_C$. In operation according to embodiments, two phases are implemented for the deployment of identification hosts such as identification host B. In a first such phase, authority T writes master secret key MSK (e.g., MSK 331) and host identity $ID_B$ (e.g., $ID_B$ 332) into memory (e.g., memory 330) of identification host B. Because master secret key MSK of embodiments is utilized in algorithms to provide identification and/or authentication, this key is preferably protected from tampering by storage in a tamper-resistant memory area of the identification host. In operation according to embodiments, master initialization key MIK is utilized for accessing the aforementioned tamper-resistant memory. In a second of the foregoing two phases, after application identity $ID_C$ is known, authority T writes application identity $ID_C$ into memory of identification host B. In accordance with embodiments, association between an identification host and application system is field upgradable, and thus the foregoing step of writing application identity $ID_C$ into memory of identification host B can only be accomplished using field update key FUK of embodiments. Accordingly, application identity $ID_C$, identifying the application system associated with information host B, can be changed as long as the field update key FUK is known.

In an exemplary implementation, the first of the foregoing phases is typically carried out once for each identification host while the second of the foregoing phases may be carried out for as many times as desired. For example, the second phase may be carried out when the identification host is relocated from one application system to another. It should be appreciated, however, that upon completion of phases 1 and 2 identification host B of embodiments has master secret key MSK, host identity $ID_B$, and application identity $ID_C$ stored therein.

In providing user identification and authentication according to an exemplary implementation, when user U, who holds smart user device A, identifies himself/herself to application system C via identification host B, the four parties (user U, smart user device A, identification host B, and application system C) carry out a user identification and authentication protocol as set forth below. As set forth in the exemplary implementation below, a first stage of the user identification and authentication protocol is carried out between the user U/smart user device A and identification host B and a second stage of the user identification and authentication protocol is carried out between identification host B and application system C.

Figure 6:
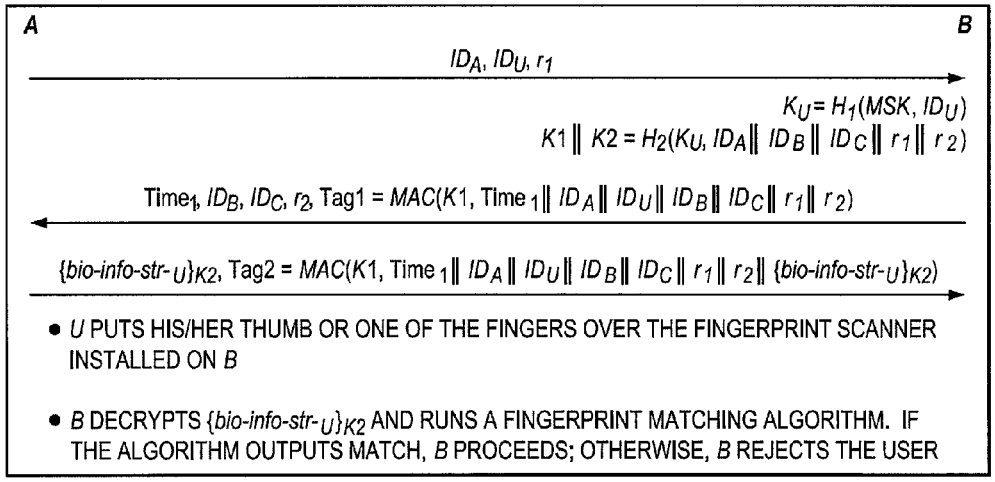
FIG. 6 shows a protocol communication flow between a smart user device and identification host of FIG. 1 according to embodiments.

According to an exemplary user identification and authentication protocol carried out between user U, smart user device A, and identification host B as illustrated in FIG. 6, user U provides a biometric sample to identification host B (e.g., user U puts his/her thumb or one of the fingers over a fingerprint scanner of identification host B). It should be appreciated that providing a biometric sample may be deferred until later in the protocol according to embodiments. User U also places or otherwise causes smart user device A to be disposed in proximity of identification host B to facilitate desired interaction (e.g., to cause a radio signal emitted by identification host B to power up smart user device A).

In operation, smart user device A sends an information string (e.g., $<ID_A, ID_U, r_1>$, where $r_1 \in_R \{0,1\}^k$) to identification host B for use in user identification and authentication. Identification host B uses the information provided by smart user device A along with other information available to identification host B for mutual authentication processing. For example, identification host B of embodiments may compute information (e.g., $K_U = H_1(MSK, ID_U)$ and $K1\|K2 = H_2(K_U, ID_A\|ID_B\|ID_C\|r_1\|r_2)$) for use in mutually authenticating smart user device A using the foregoing information. Identification host B may then send an information string (e.g., $<Time_1, ID_B, ID_C, r_2, Tag1 = MAC(K1, Time_1\|ID_A\|ID_U\|ID_B\|ID_C\|r_1\|r_2)>$, where $r_2 \in_R \{0,1\}^k$) to smart user device A for mutual authentication processing. Smart user device A may thus use the information provided by identification host B along with other information available to smart user device A to authenticate identification host B. For example, smart user device A of embodiments may independently compute information (e.g., K1 and K2) to verify information provided by identification host B (e.g., Tag1) as correct information from a legitimate identification host. If the information is determined to be correct by smart user device A, smart user device A may send a further information string (e.g., $<\{\text{bio-info-str}_U\}_{K2}, Tag2 = MAC(K1, Time_1\|ID_A\|ID_U\|ID_B\|ID_C\|r_1\|r_2\|\{\text{bio-info-str}_U\}_{K2})>$) to identification host B to complete the mutual authentication processing and for use in user identification. Identification host B may perform computations to verify that the information provided by smart user device A (e.g., Tag2) as correct information from a legitimate smart user device. If the information is determined to be correct, identification host B proceeds with identification of user U.

Identification host B of embodiments uses the biometric sample data provided by user U (e.g., the foregoing fingerprint information) for identification of user U. For example, identification host B may decrypt biometric data provided by smart user device A (e.g., $\{\text{bio-info-str}_U\}_{K2}$) and perform a biometric matching algorithm using this information and the biometric sample information. If the algorithm indicates a match of the biometric information, identification host B of embodiments determines that user U and smart user device A are authentic (e.g., sets a flag ACK :=1) and permits further processing according to the user identification and authentication protocol. For example, identification host B may update a transaction log file (e.g., by adding a transaction information string, such as <Time$_1$, ID$_A$, ID$_U$, ID$_B$, ID$_E$, r$_1$, r$_2$, Tag1, Tag2, ACK>, to a log file), discards all temporary values (e.g., $\{\text{bio-info-str}_U\}_{K2}$), and proceeds to the next phase of the user identification and authentication protocol.

If, however, the biometric matching algorithm indicates a mismatch of the biometric information, identification host B of embodiments determines that user U and smart user device A are not authentic (e.g., sets a flag ACK :=0) and identification host B halts and rejects the user. It should be appreciated that embodiments may permit a plurality of attempts (e.g., obtain and analyze multiple biometric samples) before concluding that user U and smart user device A are not authentic.

Figure 7:
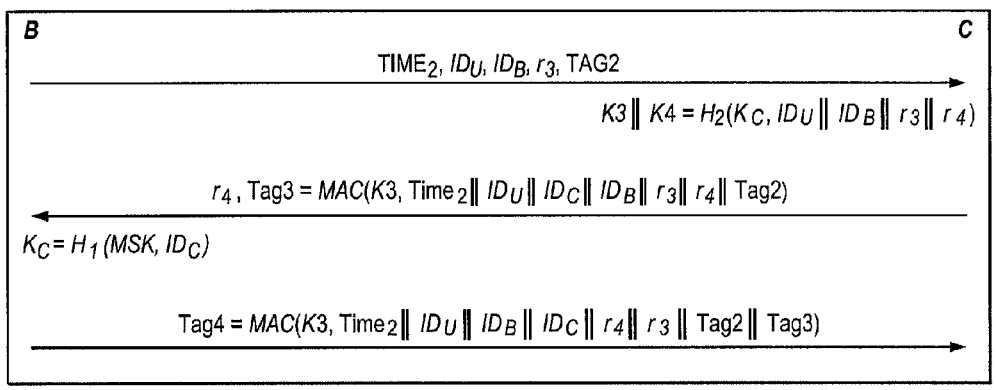
FIG. 7 shows a protocol communication flow between an identification host and application system of FIG. 1 according to embodiments.

According to an exemplary user identification and authentication protocol carried out between identification host B and application system C as illustrated in FIG. 7, identification host B sends an information string (e.g., <Time$_2$, ID$_U$, ID$_B$, r$_3$, Tag2>, where $r_3 \in_R \{0,1\}^k$) to application system C for use in mutual authentication processing. Application system C of embodiments determines if the first two components in the received message are ID$_U$ and ID$_B$. Application system C may be provided with information regarding ID$_U$ and/or ID$_B$ in advance to facilitate the foregoing determination, such as by entering particular accepted values for ID$_U$ and/or ID$_B$ into application system C before carrying out the protocol. Such operation may be useful, for example, for user U to verify the value of ID$_U$ shown on application system C before proceeding with the identification protocol. However, if this verification is not desired, application system C may operate to omit determinations with respect to either or both of the foregoing information (e.g., application system C may only determine if the second component in the received message is ID$_B$).

Assuming the connection request from identification host B is accepted by application system C, application system C of embodiments may compute information (e.g., K3||K4=H$_2$(K$_C$, ID$_U$||ID$_B$||r$_3$||r$_4$)) for use in mutually authenticating identification host B using the foregoing information. Application system C may then send an information string (e.g., <r$_4$, Tag3=MAC(K3, Time$_2$||ID$_U$||ID$_C$||ID$_B$||r$_3$||r$_4$||Tag2)>, where $r_4 \in_R \{0,1\}^k$) to identification host B for mutual authentication processing. Identification host B may thus use the information provided by application system C along with other information available to identification host B to authenticate application system C. For example, identification host B of embodiments may independently compute information (e.g., K$_C$=H$_1$(MSK, ID$_C$) and K3 and K4) to verify information provided by application system C (e.g., Tag3) as correct information from a legitimate application system. If the information is determined to be correct by identification host B, identification host B may send a further information string (e.g., <Tag4=MAC(K3, Time$_2$||ID$_U$||ID$_B$||ID$_C$||r$_4$||r$_3$||Tag2||Tag2)>) to application system C to complete the mutual authentication processing and for use in user identification. Application system C may perform computations to verify that the information provided by identification host B (e.g., Tag4) as correct information from a legitimate identification host. If the identification host is determined to be legitimate, application system C of embodiments proceeds with the application, thereby providing controlled access to the application. Additionally, application system C may update a transaction log file (e.g., by adding a transaction information string, such as <Time$_2$, ID$_U$, ID$_B$, ID$_C$, r$_3$, r$_4$, Tag3, Tag4>, to a log file) for keeping a protocol transcript log.

It should be appreciated that information shared between and/or computed by the various parties (e.g., smart user device A, identification host B, and application system C) may be utilized in providing secure communication channels in the user identification and authentication processing and/or communications thereafter. For example, session key K4 may be used by application system C for establishing a secure channel between identification host B and application system C, such as for exchanging user credentials, for relaying operational interaction, etc.

From the foregoing description of a user identification and authentication protocol implemented in accordance with the concepts of the present invention it can be appreciated that mutual authentication is provided between smart user device A and identification host B as well as between identification host B and application system C. Moreover, identification of user U is provided, using a two-factor authentication technique for user identification and authentication, wherein the factors used include something the user is (e.g., biometric data) and something the user possesses (e.g., smart user device), without biometric data for the user being stored centrally or otherwise in systems outside the possession of the user. Embodiments implementing the foregoing protocol facilitate a decentralized approach to user identification and authentication wherein a user may interact with any of a number of identification hosts (e.g., identification hosts which have not been provisioned a priori for use by the particular user) for user identification and authorization herein.

The above described protocol further facilitates auditing and tracing of user identification and authentication and/or resource access. For example, transcripts of the process of user identification and authentication and/or resource authentication may be logged by an identification host and/or application system to facilitate auditing and tracking. Such an identification host may, for example, establishes a secure channel with a system server (e.g., a server of authority T) to periodically (e.g., once a day or once every 50 entries are recorded, whichever comes first) upload the content of its log file to a repository in a regular basis. An application system may similarly upload its log file, such as for matching and auditing.

It should be appreciated that the foregoing protocol may be implemented with respect to a plurality of use scenarios wherein user identification and authentication are desired to provide controlled access with respect to one or more application. For example, a smart user device may be utilized in providing biometric identification of a user and authentication with respect to the user for providing user access to a particular application. An identification host having an appropriate smart device reader and biometric sensor of embodiments may operate in accordance with the foregoing protocol to provide mutual authentication with respect to the smart user device and, using biometric sensor data and exemplary biometric data provided by the authenticated smart user device, identify and authenticate the user. The identification host may further operate according to the foregoing protocol to mutually authenticate the application system. Thereafter, the identification host may facilitate user access to the resources of the application system, such as by passing user access credentials thereto (e.g., user name and password stored by the identification host, the smart user device, etc.).

As another example of a use scenario implementing the foregoing protocol, user identification and authentication provided according to embodiments of the invention may be utilized to provide endorsement (e.g., signing, executing, approving, etc.) of documents, wherein the user's identity is assured. For example, a user carrying a smart user device and wishing to endorse a document (e.g., report, order, negotiable instrument, etc.) may interface with an appropriate identification host to provide biometric information (e.g., fingerprint), whereby the identification host interacts with the smart user device in accordance with the foregoing protocol to identify and authenticate the user using the biometric information. The identification host may further operate according to the foregoing protocol to mutually authenticate an application system providing a document endorsement function. Thereafter, the document may be provided with an appropriate endorsement (e.g., electronic signature having authenticating features therein) of the user, thereby providing reliable user identification and authentication and facilitating auditing and tracing functionality.

It should be appreciated that information provided in accordance with the foregoing protocol may be utilized as a form of electronic signature for a user in the above endorsement scenario. For example, Tag4 may be used as a signature of the user that is secure, uniquely identifies the user, and is verifiable. In operation according to embodiments, using the log entry of identification host B (e.g., <$Time_1$, $ID_A$, $ID_U$, $ID_B$, $ID_C$, $r_1$, $r_2$, Tag1, Tag2, ACK. $Time_2$, $r_3$, $r_4$, Tag3, Tag4>), the logged transcript of application system C can be verified. Thus, information such as Tag4 serves as a non-reputable evidence that user U was involved endorsement process.

As yet another example of a use scenario implementing the foregoing protocol, user identification and authentication provided according to embodiments of the invention may be utilized to provide acknowledgement (e.g., timestamping of the user's activity, confirmation of the user's identity, etc.) for various purposes. For example, a user carrying a smart user device and wishing to timestamp an employee timesheet or wishing to be confirmed as authorized to dispense medication may interface with an appropriate identification host to provide biometric information (e.g., fingerprint), whereby the identification host interacts with the smart user device in accordance with the foregoing protocol to identify and authenticate the user using the biometric information. The identification host may further operate according to the foregoing protocol to mutually authenticate an application system providing an acknowledgment function. Thereafter, the employee timesheet associated with the user or the medication dispensing records indicated by the user may be provided with an appropriate stamp or other acknowledgement to thereby provide a reliable acknowledgement.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
providing controlled access to an application of an application system in association with a user having a smart user device assigned thereto, wherein the controlled access is provided by the application system through an identification host, the providing controlled access to the application comprising:
disposing the smart user device in proximity to the identification host;
performing mutual authentication of the smart user device and identification host;
performing mutual authentication of the identification host and the application system;
collecting a biometric sample from the user by the identification host; and
processing information to determine if the application system is to be controlled to provide the controlled access to the application, wherein the processing information includes processing, by the identification host, the biometric sample and biometric information data provided by the smart user device,
wherein performing mutual authentication of the smart user device and identification host includes providing, by the smart user device to the identification host, a user identity and a smart user device identity, and providing, by the identification host to the smart user device, an identification host identity and an application identity,
wherein performing mutual authentication of the identification host and the application system includes providing, by the identification host to the application system, the user identity and the identification host identity,
wherein performing mutual authentication of the smart user device and the identification host further includes employing one or more pseudorandom functions with symmetric key encryption, by the identification host, to compute information using the user identity, the smart user device identity, the identification host identity, and the application identity, and providing the information to the smart user device,
wherein performing mutual authentication of the identification host and the application system further includes employing the one or more pseudorandom functions with symmetric key encryption, by the application system, to compute information using the user identity, the identification host identity, and the application identity, and providing the information to the identification host,
wherein the smart user device has stored therein the user identity, a user secret key, the biometric information data, and the smart user device identity, wherein the application system has stored therein the application identity and an application key;

wherein the identification host has stored therein the identification host identity, the application identity, and a master secret key; and wherein the user secret key and the application key are computed, prior to storage thereof, using the one or more pseudorandom functions and the master secret key, and are utilized to provide the mutual authentication.

2. The method of claim 1, wherein the controlled access comprises:

controlling operation of the application to provide electronic endorsement of a document.

3. The method of claim 2, wherein the document is at least one of a report, an order, or a negotiable instrument.

4. The method of claim 1, wherein the controlled access comprises:

controlling the application to provide interaction with the user.

5. The method of claim 4, further comprising:

obtaining user credentials from the smart user device; and providing the user credentials to the application to implement the interaction with the user.

6. The method of claim 1, wherein the controlled access comprises:

controlling operation of the application to provide an electronic acknowledgement.

7. The method of claim 6, wherein the electronic acknowledgement comprises an electronic acknowledgement that is at least one of:

a timestamp; or an indication of user identity confirmation.

8. The method of claim 1, wherein the processing information comprises:

verifying the biometric sample against the biometric information data provided by the smart user device.

9. The method of claim 1, wherein the smart user device is at least one of a smartcard, a wireless dongle, a wired dongle, a touch memory, or a processor-based module.

10. The method of claim 1, wherein the biometric sample is at least one of a fingerprint sample, an iris sample, a retina sample, a voice sample, or a DNA sample.

11. The method of claim 1, further comprising:

creating a transaction log including information for auditing the controlled access of the application.

12. A method comprising:

providing electronic endorsement of a document by a user having a smart user device associated therewith, wherein the electronic endorsement is provided by an application system for which access is controlled through an identification host, the providing electronic endorsement of the document comprising:

disposing the smart user device in proximity to the identification host;

collecting a biometric sample from the user by the identification host; and processing information to determine if the application system is to be controlled to provide the electronic endorsement to the document, wherein the processing information includes processing, by the identification host, the biometric sample and biometric information data provided by the smart user device, and performing authentication processing to mutually authenticate the smart user device and the identification host and to mutually authenticate the identification host and the application system, wherein performing authentication processing to mutually authenticate the smart user device and the identification host includes providing, by the smart user device to the identification host, a user identity and a smart user device identity, and providing, by the identification host to the smart user device, an identification host identity and an application identity, wherein performing authentication processing to mutually authenticate the identification host and the application system includes providing, by the identification host to the application system, the user identity and the identification host identity, wherein performing authentication processing to mutually authenticate the smart user device and the identification host further includes employing one or more pseudorandom functions with symmetric key encryption, by the identification host, to compute information using the user identity, the smart user device identity, the identification host identity, and the application identity, and providing the information to the smart user device, wherein performing authentication processing to mutually authenticate the identification host and the application system further includes employing the one or more pseudorandom functions with symmetric key encryption, by the application system, to compute information using the user identity, the identification host identity, and the application identity, and providing the information to the identification host, wherein the smart user device has stored therein the user identity, a user secret key, the biometric information data, and the smart user device identity, wherein the application system has stored therein the application identity and an application key;

wherein the identification host has stored therein the identification host identity, the application identity, and a master secret key; and wherein the user secret key and the application key are computed, prior to storage thereof, using the one or more pseudorandom functions and the master secret key, and are utilized to provide the mutual authentication.

13. The method of claim 12, wherein the processing information comprises:

verifying the biometric sample against the biometric information data provided by the smart user device.

14. The method of claim 12, wherein the processing information comprises:

performing, if the mutual authentication processing of the smart user device and the identification host is successful, identification processing of the user using the biometric information data stored by the smart user device and the biometric sample collected by the identification host; and controlling, if the user identification processing is successful, access with respect to the application system to provide the electronic endorsement in accordance with the user identification.

15. The method of claim 12, wherein the document is at least one of a report, an order, or a negotiable instrument.

16. The method of claim 12, wherein the smart user device is at least one of a smartcard, a wireless dongle, a wired dongle, a touch memory, or a processor-based module.

17. The method of claim 12, wherein the biometric sample is at least one of fingerprint sample, an iris sample, a retina sample, a voice sample, or a DNA sample.

18. The method of claim 12, further comprising:
appending, if the application system is determined to be controlled to provide the electronic endorsement to the document, an electronic endorsement to the document.

19. The method of claim 18, further comprising:
generating the electronic endorsement using information provided by the smart user device.

20. The method of claim 18, further comprising:
creating a transaction log including information for verifying the electronic endorsement.

21. The method of claim 20, wherein the transaction log includes a copy of the electronic endorsement.

22. A method comprising:
performing authentication processing to mutually authenticate a smart user device and an identification host and to mutually authenticate the identification host and an application system;
performing, if the mutual authentication processing of the smart user device and the identification host is successful, identification processing, by the identification host, of a user associated with the smart user device using biometric information data stored by the smart user device and biometric data collected by the identification host; and
controlling, if the user identification processing is successful, access with respect to the application system in accordance with the user identification,
wherein performing authentication processing to mutually authenticate the smart user device and the identification host includes providing, by the smart user device to the identification host, a user identity and a smart user device identity, and providing, by the identification host to the smart user device, an identification host identity and an application identity,
wherein performing authentication processing to mutually authenticate the identification host and the application system includes providing, by the identification host to the application system, the user identity and the identification host identity,
wherein performing authentication processing to mutually authenticate the smart user device and the identification host further includes employing one or more pseudorandom functions with symmetric key encryption, by the identification host, to compute information using the user identity, the smart user device identity, the identification host identity, and the application identity, and providing the information to the smart user device,
wherein performing authentication processing to mutually authenticate the identification host and the application system further includes employing the one or more pseudorandom functions with symmetric key encryption, by the application system, to compute information using the user identity, the identification host identity, and the application identity, and providing the information to the identification host,
wherein the smart user device has stored therein the user identity, a user secret key, the biometric information data, and the smart user device identity,
wherein the application system has stored therein the application identity and an application key;
wherein the identification host has stored therein the identification host identity, the application identity, and a master secret key; and
wherein the user secret key and the application key are computed, prior to storage thereof, using the one or more pseudorandom functions and the master secret key, and are utilized to provide the mutual authentication.

23. The method of claim 22, wherein the controlled access comprises:
controlling operation of an application of the application system to provide electronic endorsement of a document.

24. The method of claim 23, wherein the document is at least one of a report, an order, or a negotiable instrument.

25. The method of claim 22, wherein the controlled access comprises:
controlling an application of the application system to provide interaction with the user.

26. The method of claim 25, further comprising:
obtaining user credentials from the smart user device; and
providing the user credentials to the application to implement the interaction with the user.

27. The method of claim 22, wherein the controlled access comprises:
controlling operation of an application of the application system to provide an electronic acknowledgement.

28. The method of claim 27, wherein the electronic acknowledgement comprises an electronic acknowledgement corresponding to at least one of:
a timestamp; or
an indication of user identity confirmation.

29. A system comprising:
a smart user device storing user device identity information, a user secret key, user identity information, and biometric data, the user identity information and the biometric data being of a user associated with the smart user device,
an identification host storing host identity information and application system information, the application system information identifying an application to which the user is provided controlled access when disposing the smart user device in proximity to the identification host, the identification host operable under control of a protocol defining operation to mutually authenticate the smart user device and the identification host and to provide the controlled access to the application to the user identified by the smart user device; and
an application system storing the application system identity information and an application key, the application system operable under control of the protocol defining operation to mutually authenticate the identification host and the application system and to provide the controlled access to the application to the user identified by the smart user device,
wherein the smart user device is operable under control of the protocol defining operation to mutually authenticate the smart user device and the identification host with which the smart user device communicates and to identify the user to the identification host to thereby provide controlled access to the application that is used to control endorsement of a document to the user when disposing the smart user device in proximity to the identification host,
wherein, according to the protocol, the smart user device provides the user identity information and the user device identity information to the identification host, and receives, from the identification host, an identification host identity and an application identity,
wherein, according to the protocol, the identification host provides, to the application system, the user identity information and the host identity information, wherein, according to the protocol, the identification host employs one or more pseudorandom functions with symmetric key encryption to compute information using the user identity, the smart user device identity information, the host identity information, and the application identity, and provides the information to the smart user device, wherein, according to the protocol, the application system employs the one or more pseudorandom functions with symmetric key encryption to compute information using the user identity information, the host identity information, and the application identity, and provides the information to the identification host, wherein the identification host has stored therein a master secret key, and wherein the user secret key and the application key are computed, prior to storage thereof, using the one or more pseudorandom functions and the master secret key, and are utilized to provide the mutual authentication.

30. The system of claim 29, wherein the smart user device is at least one of a smartcard, a wireless dongle, a wired dongle, a touch memory, or a processor-based module.

31. The system of claim 29, wherein the smart user device is adapted for wireless communication with the identification host when disposed in proximity to the identification host.

32. The system of claim 29, wherein the smart user device is adapted for wired connection to the identification host when disposed in proximity to the identification host.

33. The system of claim 29, wherein the biometric data is at least one of fingerprint data, iris print data, retina print data, voice print data, or DNA data.

34. The system of claim 29, wherein the biometric data comprises a biometric data from a plurality of samples.

35. The system of claim 34, wherein the plurality of samples comprise samples taken using a plurality of different configurations of biometric scanners, each such biometric scanner providing sampling of a same biometric attribute.

36. The system of claim 34, wherein the plurality of samples comprise samples taken using a plurality of different configurations of biometric scanners, each such biometric scanner providing sampling of a different biometric attribute.

37. The system of claim 29, wherein the controlled access comprises:
controlling operation of the application to provide electronic endorsement of a document.

38. The system of claim 29, wherein the controlled access comprises:
controlling the application to provide interaction with the user.

39. The system of claim 29, wherein the controlled access comprises:
controlling operation of the application to provide an electronic acknowledgement.

40. The method of claim 1, wherein performing mutual authentication of the smart user device and identification host includes providing, by the identification host to the smart user device, a timestamp with the identification host identity and application identity, and wherein performing mutual authentication of the identification host and the application system includes providing, by the identification host to the application system, a timestamp with the user identity and the identification host identity.

* * * * *

UNITED STATES PATENT AND TRADEMARK OFFICE
CERTIFICATE OF CORRECTION

PATENT NO. : 8,988,187 B2  
APPLICATION NO. : 13/006145  
DATED : March 24, 2015  
INVENTOR(S) : Shek Duncan Wong et al.

Page 1 of 1

It is certified that error appears in the above-identified patent and that said Letters Patent is hereby corrected as shown below:

In the Specification:
At column 17, line number 21, delete "$ID_E$" and replace with --$ID_C$--.
At column 18, line number 4, delete "TAG2∥TAG2" and replace with --TAG2∥TAG3--.
At column 19, line number 39, delete "ACK." and replace with --ACK,--.

In the Claims:
At column 22, claim number 17, line number 66, delete "of fingerprint" and replace with --of a fingerprint--.

Signed and Sealed this
Thirtieth Day of June, 2015

Michelle K. Lee
*Director of the United States Patent and Trademark Office*